United States Patent [19]

Bättig et al.

[11] Patent Number: 5,743,707
[45] Date of Patent: Apr. 28, 1998

[54] CONTACT SEAL FOR TURBOMACHINES RUNNING AT HIGH SPEED AND/OR HAVING HIGH TEMPERATURES IN THE SEALING REGION

[75] Inventors: Josef Bättig, Egliswil; Mehmet Güven Kutay, Baden, both of Switzerland

[73] Assignee: Asea Brown Boveri AG, Baden, Switzerland

[21] Appl. No.: 742,810

[22] Filed: Nov. 1, 1996

[30] Foreign Application Priority Data

Nov. 24, 1995 [DE] Germany .................. 195 43 764.0

[51] Int. Cl.$^6$ ...................................... F01D 11/00
[52] U.S. Cl. .................. 415/113; 415/170.1; 415/174.2; 277/935 D; 277/96.1; 277/96.2; 277/166
[58] Field of Search ................. 415/113, 170.1, 415/173.1, 173.7, 174.2, 174.3, 230, 231; 277/96, 96.1, 96.2, 166, 935 D

[56] References Cited

U.S. PATENT DOCUMENTS

| | | |
|---|---|---|
| 2,274,234 | 2/1942 | Ekkebus et al. |
| 2,736,584 | 2/1956 | Riesing. |
| 3,306,223 | 2/1967 | Liebig. |
| 4,576,386 | 3/1986 | Benson et al. ............... 277/165 |
| 4,858,516 | 8/1989 | Klein ............... 277/166 |
| 5,218,816 | 6/1993 | Plemmons et al. |
| 5,233,824 | 8/1993 | Clevenger ............... 415/174.2 |

FOREIGN PATENT DOCUMENTS

| | | | |
|---|---|---|---|
| 0024242 | 10/1950 | Finland ............... 415/231 |
| 1919666 | 10/1970 | Germany ............... 277/96 |
| 2554840 | 6/1976 | Germany. |
| 3050229A1 | 9/1981 | Germany. |
| 3117755C2 | 10/1983 | Germany. |
| 3500466A1 | 7/1986 | Germany. |
| 212843 | 5/1967 | Sweden. |
| 1149056 | 4/1985 | U.S.S.R. ............... 415/174.2 |
| 123352 | 2/1919 | United Kingdom. |
| 1111326 | 4/1968 | United Kingdom. |

OTHER PUBLICATIONS

"Werkstoffe", Busak & Luyken, 1991.

Primary Examiner—Christopher Verdier
Attorney, Agent, or Firm—Burns, Doane, Swecker & Mathis, L.L.P.

[57] ABSTRACT

A contact seal for turboengines is disclosed which is suitable for high circumferential speeds and high temperatures. The contact seal is of at least a two-part design and includes a thin carrier ring and a sealing ring. The sealing ring is constructed from a wear, oil, and heat resistant material, while the carrier ring includes an elastic material which is completely reversible even under high loads, and preferably is constructed of spring steel. The carrier ring has an inner fastening pan and an outer carrying part. The carrying part is positively connected to the sealing ring. The carrying part is designed to be inclined in the direction of the sealing face.

10 Claims, 2 Drawing Sheets

CONTACT SEAL FOR TURBOMACHINES RUNNING AT HIGH SPEED AND/OR HAVING HIGH TEMPERATURES IN THE SEALING REGION

BACKGROUND OF THE INVENTION

1. Field of the Invention

The invention relates to a contact seal for turboengines running at high speed and/or having high temperatures in the sealing region, according to the preamble of claim 1.

2. Discussion of Background

Recent exhaust gas turbochargers operated with an external oil supply usually have a sliding bearing assembly between the turbine wheel and compressor wheel. Preferably contactless seals, such as labyrinths, piston rings, etc., are used for sealing off the bearing housing relative to the flow housing of the turbine and compressor.

Such seals do not experience wear and, moreover, are relatively cost-effective. The disadvantage of contactless seals is, however, that they have oil leakages whenever the bearing-side pressure exceeds the pressure on the air or exhaust gas side. This occurs, in particular, during engine idling and in the case of an increased intake vacuum.

The contact seal known from SE 212,843, which consists of elastomers, was provided to remedy this. This so-called "V-ring" bears on the sealing region during the idling of the engine and lifts off only at a specific rotational speed which is above the critical operating state. This prevents it from experiencing premature wear.

If relatively high circumferential speeds occur, however, the V-ring has to be supported by means of a metal ring. For circumferential speeds of up to 150 m/s and brief temperatures of more than 300° C. in the sealing region, such as occur in modern turbochargers, however, such encased V-rings are also unsuitable.

In other turboengines, there are similar problems as regards sealing off between adjacent working spaces, such as, for example, between bearing and flow housings of gas turbine plants.

SUMMARY OF THE INVENTION

The invention attempts to avoid all these disadvantages. It is based on the object of providing a contact seal for turboengines which is also suitable for high circumferential speeds and high temperatures.

This is achieved, according to the invention, in that, in a device according to the preamble of claim 1, the contact seal is of at least two-part design and consists of a thin carrier ring and of the sealing ring. The sealing ring is manufactured from a wear resistant and sufficiently oil and heat resistant material. In contrast to this, the carrier ring consists of an elastic material which is reversible even under high loads, such as rotational speed, temperature and time. It has an inner fastening part and an outer carrying part. The latter is positively connected to the sealing ring. When the contact seal is in the mounted state, at least the carrying part is designed to be inclined in the direction of the sealing face.

On account of the two-part design, the sealing and fastening functions of the contact seal can be separated from one another and be transferred to components specially designed for the relevant purpose. It is therefore possible to produce a sealing ring from a material which is resistant even at high temperatures. The material of the carrier ring guarantees for the sealing ring the supporting effect which is necessary at high circumferential speeds. Due to the inclination of the carrying part in the direction of the sealing face and to the elastic material of the carrier ring, the sealing ring lifts off from the sealing face at a rotational speed which is above the critical operating state. Carrier rings made of different materials can be used in accordance with the circumferential speeds to be expected. Thus, even in extreme operating situations, an optimum and permanent sealing off of adjacent working spaces of a turboengine is guaranteed.

The sealing ring advantageously has an outer face, the circumference of which increases in the direction of the sealing face. A sealing edge bearing on the sealing face is formed on the largest circumference of the outer face. By virtue of this design of the sealing ring, the sealing edge is always kept free of oil. Moreover, edge pressure is always achieved even when the prestresses on the contact seal are of different magnitude. This results in improved sealing off and an exact grinding in of the sealing ring.

It is particularly expedient if the carrier ring consists of a metal diaphragm, preferably made from spring steel, and the sealing ring consists of a heavy-duty plastic, for example PEEK (polyether-etherketone) or PI (polyimide). The heavy-duty plastic can additionally have a graphite component. Such a metal diaphragm has stable spring properties, with the result that the lifting off of the sealing ring at an extremely high rotational speed of the turbocharger is improved or becomes reproducible. Said heavy-duty plastic is particularly suitable for the production of highly stressed contact seals on account of its good wear properties and its oil and heat resistance.

Furthermore, it is advantageous if the carrier part is bent over at its free outer region. In this case, either the sealing ring surrounds the carrying part in the bent region of the latter or the bent region of the carrying part surrounds the sealing ring, in each case at least partially. For this purpose, the heavy-duty plastic is injected or pressed around the metal diaphragm, thus resulting in a simple positive connection of the carrying part to the sealing ring. In a second alternative, a material connection between the sealing ring and carrying part is made, in addition to the positive connection, by adhesive bonding or welding.

Finally, a plurality of slots are formed on the circumference of the carrying part, said slots extending at most over the entire fastening region of the sealing ring, but at least being arranged in the bent region of the carrying part. The preferably semicircular slots improve the elasticity of the contact seal and prevent stresses on its circumference. The inner fastening part of the carrier ring is fastened nonpositively or positively between the working spaces.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, which show several exemplary embodiments of the invention with reference to a contact seal for exhaust gas turbochargers and wherein.

Only the elements essential for understanding the invention are shown. For example, the turbine side of the exhaust gas turbocharger is not shown. The direction of flow of the working media is represented by arrows.

DESCRIPTION OF THE PREFERRED EMBODIMENTS

Figure 1:
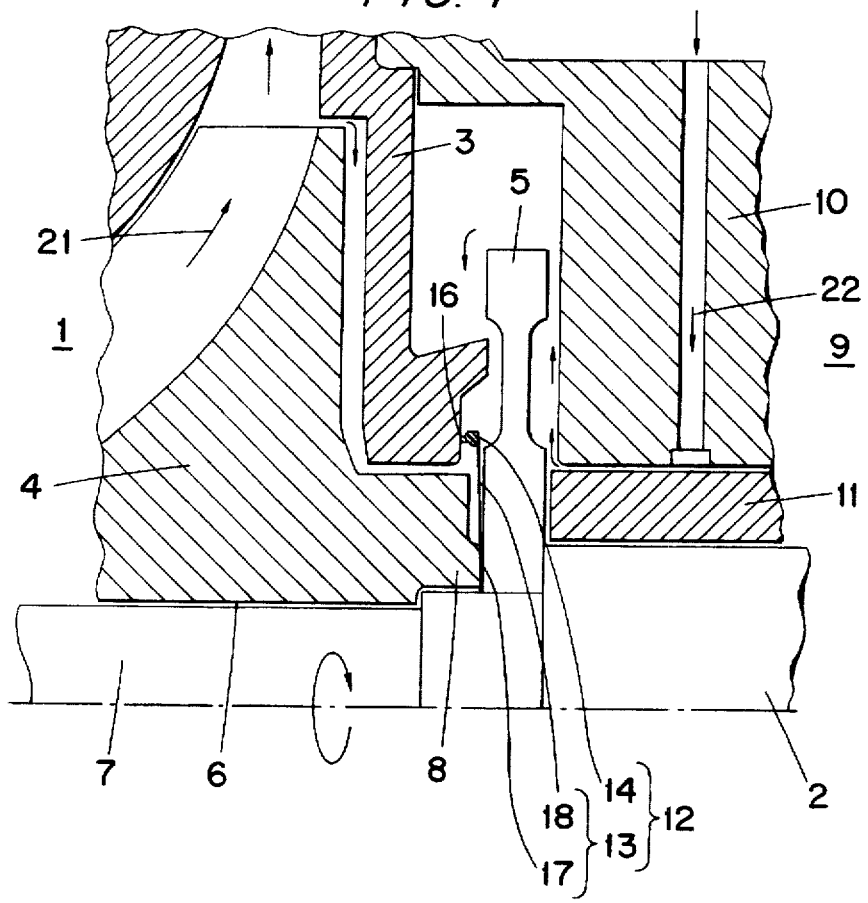
FIG. 1 shows a part longitudinal section through the turbocharger housing with a contact seal arranged between the compressor housing and bearing housing.

Referring now to the drawings, wherein like reference numerals designate identical or corresponding parts throughout the several views, the exhaust gas turbocharger consists of a compressor 1 and of an exhaust gas turbine which are both arranged on a common shaft 2. The compressor 1 has a compressor housing 3, a compressor wheel 4 and a spacer ring 5 designed as a centrifugal disk. The compressor wheel 4 possesses a central bore 6 for receiving one end 7 of the shaft 2. For this purpose, the compressor wheel 4 has a wheel bush 8 extended into the compressor housing 3. Arranged axially next to the centrifugal disk 5 is a bearing region 9 which consists of a bearing housing 10 and of a sliding bearing 11. Two working spaces of the turbocharger which have different pressure conditions are connected to one another by means of the compressor 1 and the bearing region 9 and are sealed off from one another. For this purpose, a contact seal 12 is arranged nonpositively between these working spaces 1, 9 (FIG. 1). Of course, such a contact seal 12 can also be used for sealing off the exhaust gas turbine (not shown) relative to the bearing region 9.

Figure 2:
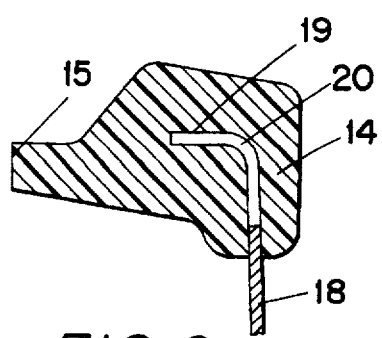
FIG. 2 shows the contact seal in an enlarged representation in a first embodiment.

The contact seal 12 consists of a thin carrier ring 13 designed as a metal diaphragm and of a sealing ring 14. The sealing ring 14 possesses a sealing nose 15 (FIG. 2) which bears on a sealing face 16 of the compressor housing 3 (FIG. 1). The metal diaphragm 13 consists of spring steel, but can also be manufactured from another material, for example spring bronze. It has an inner fastening part 17 and an outer carrying part 18. The carrying part 18 is bent over at its free outer region 19 in the direction of the sealing face 16 and is designed to be inclined in the same direction. Of course, the outer region 19 of the carrying part 18 can also be bent over in the opposite direction (not shown). The sealing ring 14 surrounds the carrying part 18 in the bent region 19 of the latter. Formed on the circumference of the carrying part 18 are a plurality of slots 20 which extend over virtually the entire fastening region of the sealing ring 14 on the carrying part 18 (FIG. 2). The slots are of semicircular design. The inner fastening part 17 of the metal diaphragm 13 is clamped between the axial regions of the wheel bush 8 and of the centrifugal disk 5 (FIG. 1).

Polyether-ether-ketone (PEEK), which can additionally contain a graphite component, is used as material for the sealing ring 14. This wear resistant and sufficiently oil and heat resistant heavy-duty plastic is particularly suitable for sealing off between the compressor housing 3 and bearing housing 10 of the turbocharger. Of course, other heavy-duty plastics, such as, for example, polyimide (PI), can also be used. In the production of the contact seal 12, the heavy-duty plastic is injected around the metal diaphragm 13, thus resulting in a simple positive connection of the carrying part 18 to the sealing ring 14. Of course, the positive connection can also be made by appropriately pressing the heavy-duty plastic onto the metal diaphragm 13.

The contact seal 12 can likewise be arranged, with the same advantageous effect, between the adjacent working spaces of another turboengine which have different pressure conditions.

When the turbocharger is operating normally, the compressor 1 and bearing region 9 are sealed off from one another by means of the contact seal 12. The reciprocal penetration of air 21, as the working medium of the compressor 1, and of lubricating oil 22, as the working medium of the bearing region 9, into the other working space 9 or 1 respectively is thereby prevented. For this purpose, the carrying part 18 is inclined in the direction of the sealing face 16, so that the sealing ring 14 bears with its sealing nose 15 on the compressor housing 3. At the same time, the metal diaphragm 13 guarantees for the sealing ring 14 the supporting effect which is necessary at high circumferential speeds, whilst the slots 20 improve the elasticity of the contact seal 12 and prevent stresses from forming on its circumference. If the rotational speed is increased above the critical operating state, the lifting off of the sealing ring 14 from the sealing face 16 occurs by virtue of the spring effect of the metal diaphragm 13. In this situation, the sealing off of the compressor 1 and bearing region 9 is guaranteed by the fact that a higher pressure is built up on the compressor side. Moreover, in the rotating state, the centrifugal disk 5 acts as a dynamic seal, that is to say it has a spray effect. With a decreasing rotational speed of the turbocharger, the sealing ring 14 resumes its initial position on the sealing face 16.

Figure 3:
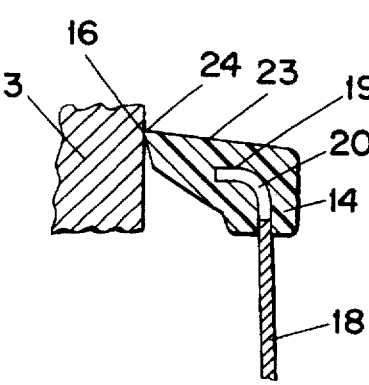
FIG. 3 shows the contact seal according to FIG. 2 in a second embodiment.

In a second exemplary embodiment, the sealing ring 14 has an outer face 23, the circumference of which increases in the direction of the sealing face 16 of the compressor housing 3. Formed on the largest circumference of the outer face 23 is a sealing edge 24, with which the sealing ring 14 bears on the sealing face 16 of the compressor housing 3 (FIG. 3). Since the circumference of the outer face 23 of the sealing ring 14 decreases towards the bearing side, the lubricating oil 22 always flows off in this direction. The sealing edge 24 is thereby kept free of oil. Moreover, edge pressure is always achieved in the radially outer region of the sealing ring 14, even in the case of varying prestresses on the contact seal 12. This results in an improved sealing effect.

Figure 4:
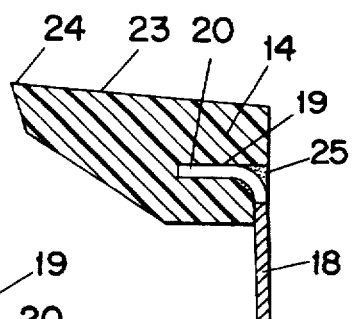
FIG. 4 shows the contact seal according to FIG. 2 in a third embodiment.

In a third exemplary embodiment, the sealing ring 14 only partially surrounds the carrying part 18 of the metal diaphragm in the bent region 19 of said carrying part (FIG. 4). An adhesive 25 is applied in the interspace of the sealing ring 14 and bent region 19, that is to say where the latter is no longer surrounded directly by the sealing ring 14. This also results in a stable adhesive bond of the sealing ring 14 and carrying part 18 in addition to the positive connection. Of course, another material connection can also be made, for example by welding.

Figure 5:
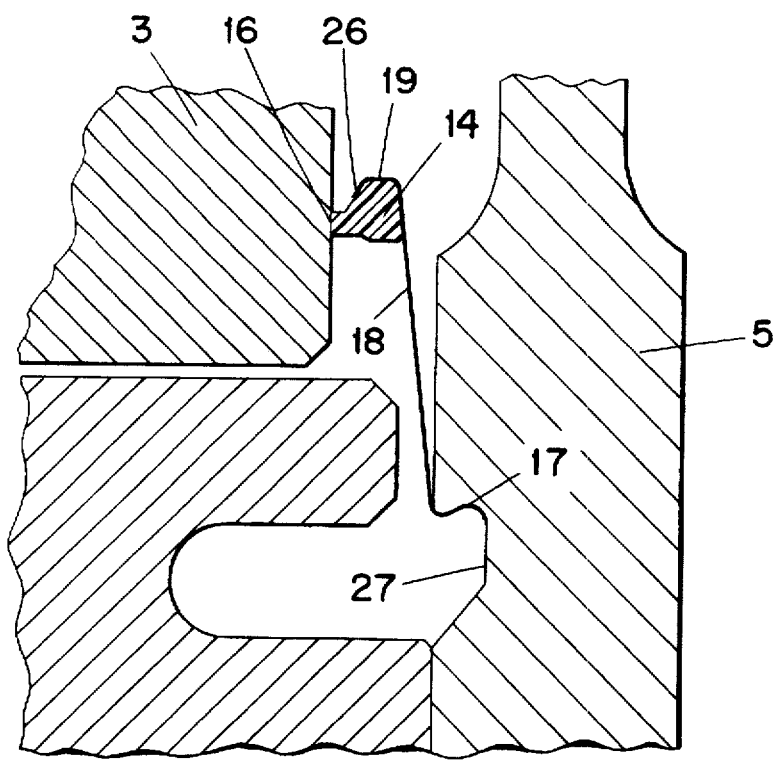
FIG. 5 shows a part longitudinal section through the turbocharger housing according to FIG. 1 in a further embodiment.
Figure 6:
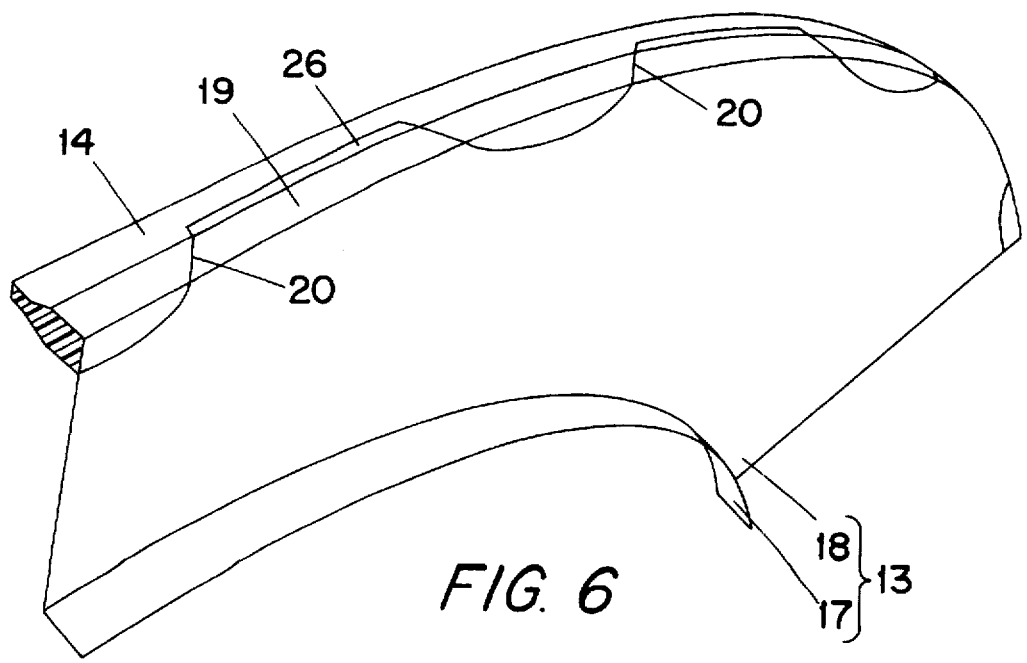
FIG. 6 shows an enlarged representation of the contact seal according to FIG. 5.

A further exemplary embodiment, in which the bent region 19 of the carrying part 18 partially surrounds the sealing ring 14, is shown in FIG. 5. In this case, the connection of the sealing ring 14 and carrying part 18 is made positively, that is to say by means of tabs 26 flanged inward. To fix the contact seal 12, the centrifugal disk 5 possesses, on the compressor side, a recess 27 which matches with a correspondingly designed fastening part 17 of the metal diaphragm 13. The outlay involved in mounting the contact seal 12 is reduced by virtue of this positive snap fastening. FIG. 6 shows an enlarged perspective representation of the contact seal 12 having the semicircular slots 20.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A contact seal for a turboengine including a sealing region and running at high speed and/or having high temperatures in said sealing region, which contact seal is fastened nonpositively or positively between two adjacent working spaces of said turboengine which have different pressure conditions, so as to seal off said working spaces from one another, for this purpose bears on a sealing face of one of the working spaces and lifts off from the sealing face at a rotational speed above a predetermined operating point, wherein a) the contact seal is of at least two-part design and comprises a thin carrier ring and a sealing ring,
   b) the sealing ring comprising a wear resistant and sufficiently oil and heat resistant material,
   c) the carrier ring comprising an elastic material which is completely reversible under high loads, and has an inner fastening part and an outer carrying part,
   d) the carrying part is positively connected to the sealing ring,
   e) when the contact seal is in the mounted state, at least the carrying part is designed to be inclined in the direction of the sealing face.

2. The contact seal is claimed in claim 1, wherein the sealing ring has an outer face, the circumference of which increases in the direction of the sealing face, and a sealing edge bearing on the sealing face is formed on the largest circumference.

3. The contact seal as claimed in claim 1, wherein the carrier ring comprises a metal diaphragm, and the sealing ring comprises a heavy-duty plastic.

4. The contact seal as claimed in claim 3, wherein the heavy-duty plastic comprises a graphite component.

5. The contact seal as claimed in claim 3, wherein, in addition to the positive connection of the carrying part and sealing ring, a material connection is made between the two components.

6. The contact seal as claimed in claim 1, wherein the carrying part comprises a bent region where the carrying part is bent over at its free outer region and the sealing ring at least partially surrounds the carrying part in said bent region.

7. The contact seal as claimed in claim 1, wherein the carrying part is bent over at its free outer region in the direction of the sealing face and the bent region at least partially surrounds the sealing ring.

8. The contact seal as claimed in claim 6, wherein a plurality of slots are formed on the circumference of the carrying part, said slots extending at most over the entire fastening region of the sealing ring, but at least being arranged in the bent region of the carrying part.

9. The contact seal as claimed in claim 8, wherein the slots are of semicircular design.

10. The contact seal as claimed in claim 3, wherein said metal diaphragm is made of spring steel.

* * * * *